United States Patent
Katpally Reddy et al.

(10) Patent No.: US 9,704,296 B2
(45) Date of Patent: Jul. 11, 2017

(54) IMAGE MORPHING PROCESSING USING CONFIDENCE LEVELS BASED ON CAPTURED IMAGES

(71) Applicant: Trupik, Inc., Sunnyvale, CA (US)

(72) Inventors: Vikranth Katpally Reddy, Mountain View, CA (US); Sridhar Tirumala, Saratoga, CA (US); Aravind Inumpudi, Fremont, CA (US); David Joseph Harmon, Palo Alto, CA (US)

(73) Assignee: TRUPIK, INC., Sunnyvale, CA (US)

( * ) Notice: Subject to any disclaimer, the term of this patent is extended or adjusted under 35 U.S.C. 154(b) by 0 days.

(21) Appl. No.: 14/338,093

(22) Filed: Jul. 22, 2014

(65) Prior Publication Data

US 2015/0022550 A1    Jan. 22, 2015

Related U.S. Application Data

(60) Provisional application No. 61/856,970, filed on Jul. 22, 2013.

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2210/16* (2013.01); *G06T 2219/2016* (2013.01)

(58) Field of Classification Search
CPC .... A41H 3/007; G06Q 30/0643; G06Q 50/01; G06Q 30/06; G06T 19/00; G06T 13/80
USPC ............... 345/419, 473; 705/26.61; 382/173; 702/27.2; 700/132
See application file for complete search history.

(56) References Cited

U.S. PATENT DOCUMENTS

| | | |
|---|---|---|
| 5,850,222 A | 12/1998 | Cone |
| 6,310,627 B1 | 10/2001 | Sakaguchi |
| 7,617,016 B2 * | 11/2009 | Wannier ................. A41H 3/007 700/132 |
| 8,416,236 B1 | 4/2013 | Hickman et al. |
| 8,514,220 B2 | 8/2013 | Harvill et al. |
| 8,878,850 B2 | 11/2014 | Harvill et al. |
| 9,094,670 B1 | 7/2015 | Furio et al. |
| 2004/0041804 A1 | 3/2004 | Ives et al. |

(Continued)

FOREIGN PATENT DOCUMENTS

WO    2005104883    11/2015

OTHER PUBLICATIONS

International Patent Application PCT/US2015/049022, International Search Report and Written Opinion, Dec. 22, 2015.

(Continued)

*Primary Examiner* — Devona Faulk
*Assistant Examiner* — Kevin Wu
(74) *Attorney, Agent, or Firm* — Greenberg Traurig, LLP (57) ABSTRACT

Embodiments of the present disclosure can be used to generate an image replica of a person wearing various outfits to help the person visualize how clothes and accessories will look without actually having to try them on. Images can be generated from various angles to provide the person an experience as close as possible to actually wearing the clothes, accessories and looking at themselves in the mirror. Among other things, embodiments of the present disclosure can help remove much of the current uncertainty involved in buying clothing and accessories online.

14 Claims, 11 Drawing Sheets

(56) References Cited

U.S. PATENT DOCUMENTS

| | | | |
|---|---|---|---|
| 2004/0227752 A1* | 11/2004 | McCartha | A41H 3/007 345/419 |
| 2007/0198118 A1 | 8/2007 | Lind | |
| 2007/0294142 A1* | 12/2007 | Kattner | G06Q 30/06 705/27.2 |
| 2010/0111370 A1 | 5/2010 | Black et al. | |
| 2011/0044521 A1 | 2/2011 | Tewfik et al. | |
| 2012/0110828 A1 | 5/2012 | Luisi et al. | |
| 2012/0326959 A1 | 12/2012 | Murthi et al. | |
| 2013/0108121 A1 | 5/2013 | de Jong | |
| 2013/0151382 A1* | 6/2013 | Fuller | G06Q 50/01 705/27.2 |
| 2013/0201187 A1 | 8/2013 | Tong et al. | |
| 2013/0215116 A1 | 8/2013 | Siddique et al. | |
| 2013/0245828 A1 | 9/2013 | Tateno et al. | |
| 2013/0266217 A1 | 10/2013 | Gershon et al. | |
| 2014/0010449 A1* | 1/2014 | Haaramo | G06T 19/00 382/173 |
| 2014/0176565 A1* | 6/2014 | Adeyoola | G06T 13/80 345/473 |
| 2014/0180647 A1 | 6/2014 | Hodgins et al. | |
| 2014/0180873 A1* | 6/2014 | Rijhwani | G06Q 30/0643 705/26.61 |
| 2014/0201023 A1 | 7/2014 | Tang | |
| 2016/0071324 A1 | 3/2016 | Katpally Reddy et al. | |

\* cited by examiner

IMAGE MORPHING PROCESSING USING CONFIDENCE LEVELS BASED ON CAPTURED IMAGES

CROSS-REFERENCE TO RELATED APPLICATION

This application claims priority to U.S. Provisional Patent Application No. 61/856,970, filed Jul. 22, 2013 and entitled "SYSTEMS AND METHODS FOR IMAGE PROCESSING," the disclosure of which is hereby incorporated by reference herein.

BACKGROUND

Exemplary embodiments described herein relate to systems and methods for image processing, more particularly to generating a morphable 3D replica of a fully clothed person, including their face for the purposes of generating images, from various angles, of that person wearing different clothes and accessories to facilitate online purchases.

Embodiments of the present disclosure help take the guesswork out of online shopping by generating, based on actual dimensions, images of shoppers wearing various clothing and accessories. Shoppers are thus able to see pictures of themselves in various outfits before purchasing them, and are able to see how such outfits would look and fit on the specific shopper.

BRIEF DESCRIPTION OF THE DRAWINGS

A more complete understanding of certain embodiments may be derived by referring to the detailed description and claims when considered in connection with the following illustrative figures. While these exemplary embodiments are described in sufficient detail to enable those skilled in the art to practice the disclosure, it should be understood that other embodiments may be realized and that logical and mechanical changes may be made without departing from the spirit and scope of the disclosure.

DETAILED DESCRIPTION OF EXEMPLARY EMBODIMENTS

Embodiments of the present disclosure can be used to generate an image replica of a person wearing various outfits to help the person visualize how clothes and accessories will look without actually having to try them on. Images can be generated from various angles to provide the person an experience as close as possible to actually wearing the clothes, accessories and looking at themselves in the mirror. Among other things, embodiments of the present disclosure can help remove much of the current uncertainty involved in buying clothing and accessories online. Additionally, images generated by embodiments of the present disclosure can be shared with multiple people (e.g., via email or social media), allowing a user's friends to be involved in the process of buying clothes online in real time or near-real-time.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Embodiments of the present disclosure may be implemented in software and utilize images of a subject from one or more cameras, such as digital 3-dimensional cameras, to generate simulated images showing how various garments and accessories would look on the subject. Embodiments of the present disclosure can be implemented using web-based applications to help facilitate online shopping. In this manner, embodiments of the present disclosure can provide virtual fitting rooms that help users to determine whether or not they will like garments or accessories without having to physically try them on.

In contrast to other systems, embodiments of the present disclosure can determine dimensions and characteristics of a subject without requiring the subject to remove his or her clothing. Additionally, embodiments of the present disclosure can be used to generate images of the subject's body integrated with actual 3D reconstruction of the subject's face/head, to give a more realistic representation of the subject compared to conventional virtual fitting rooms that simply use a generic "mannequin" face when displaying clothing on the mannequin. As used herein, an "image" may include a still image, a three-dimensional image, multiple images, and/or video.

Any combination and/or subset of the elements of the methods depicted herein may be practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Figure 1:
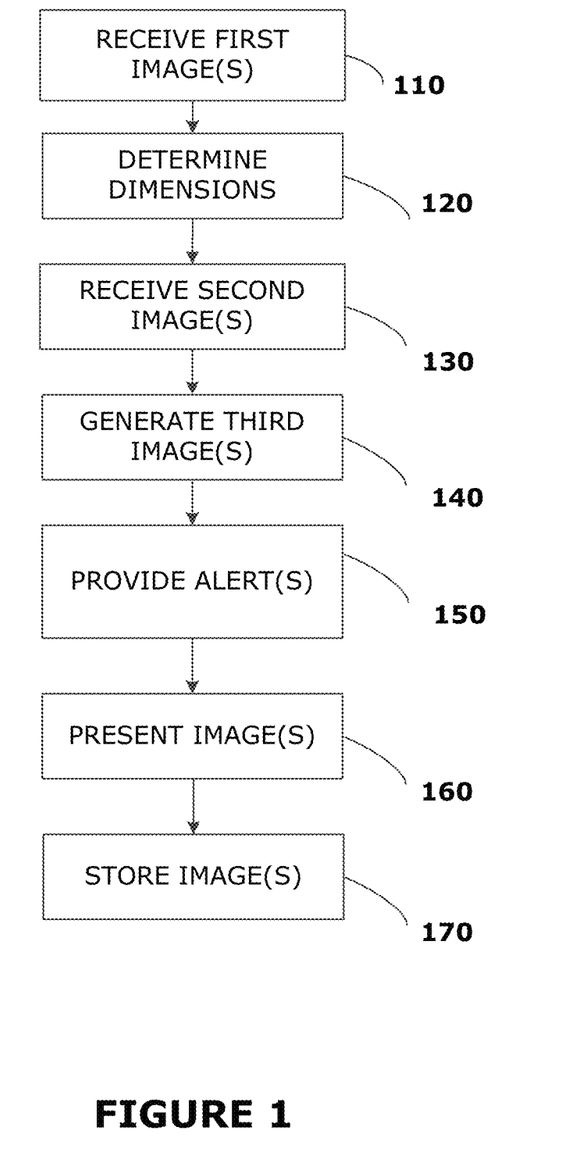
FIG. 1 is a flow diagram showing an exemplary process according to various embodiments.

FIG. 1 illustrates an exemplary process according to various aspects of the present disclosure. The exemplary method 100 includes receiving one or more first images of a human subject (110), determining, based on the first image(s), dimensions of the subject's body (120), receiving one or more second images (130), and generating a third image (140). Method 100 further includes providing one or more alerts (150), presenting the third image via a display device (160), and storing one or more images (170).

Figure 2:
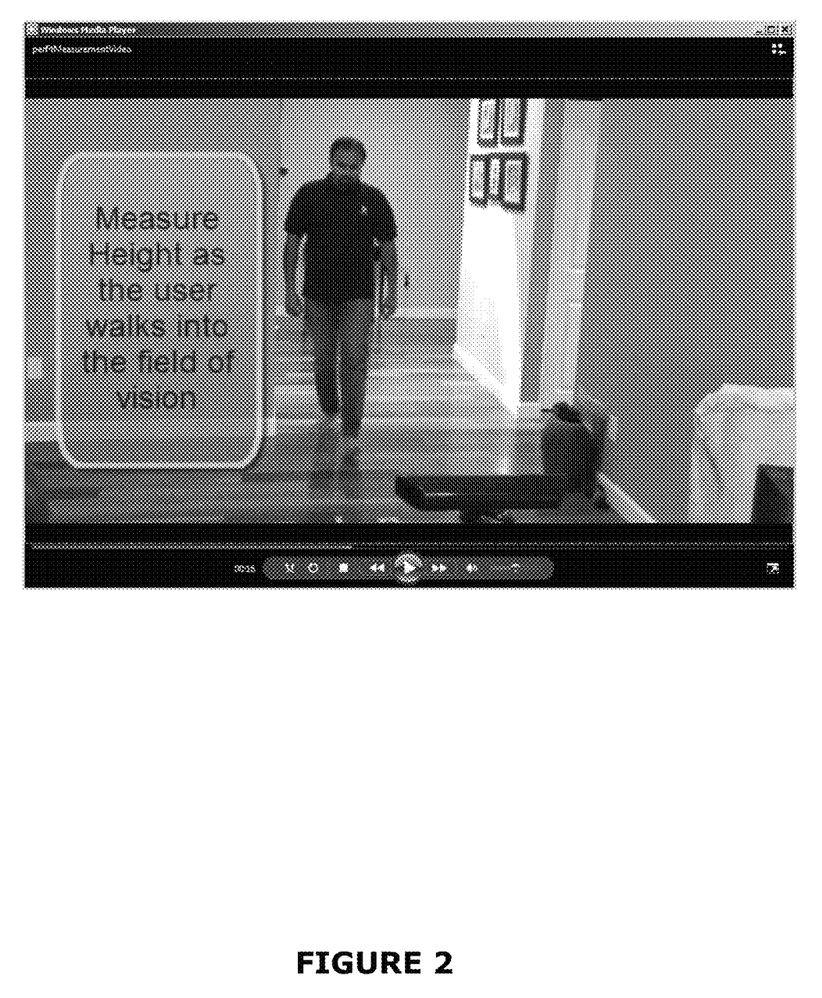
FIGS. 2-10 depict exemplary steps and for capturing images of, and measuring characteristics for, a human subject.

In some exemplary embodiments, software operating on a computer system is configured to receive one or more first images of a subject (110) that includes at least a portion of the subject's body. Based on the first set of received images, various characteristics of the subject may be determined (120), such as the dimensions of the subject's body. Referring to FIG. 2, a subject (in the background) approaches a camera (in the foreground) that is in communication with a computer system running an application implementing various aspects of this disclosure. In this example, images from the camera or other image creation device can be used to determine the subject's height.

Figure 3:
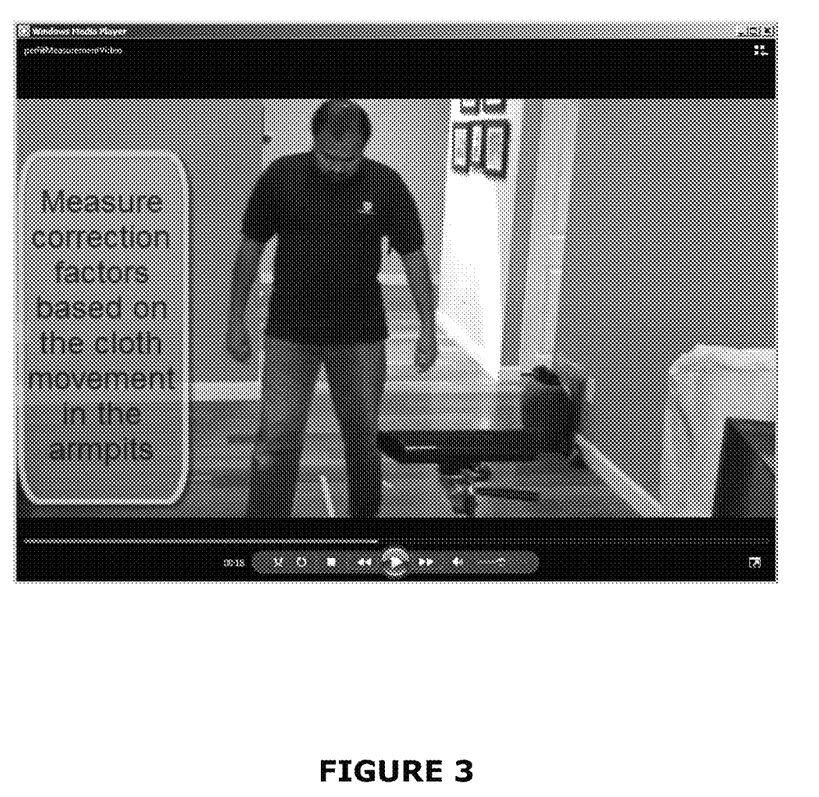

Referring now to FIG. 3-6, the subject stands in front of the camera in various poses to provide one or more second images to the computer system (130). In some embodiments, the subject need only pose in front of the camera for about ten seconds in order to provide the necessary images. In FIG. 3, characteristics of the subject are determined from the image along with error correction factors. In some embodiments, the position of the camera relative to the subject may be taken into consideration in generating error correction factors and/or other aspects of the image of the subject's body. In the example shown in FIG. 3, the error correction factors may be determined based on the manner in which the subject's clothing interfaces with the subject's armpits or other portions of the subject's body. Such factors may be applied to the generated image of the subject's body to help provide a more accurate representation of the subject.

Figure 4:
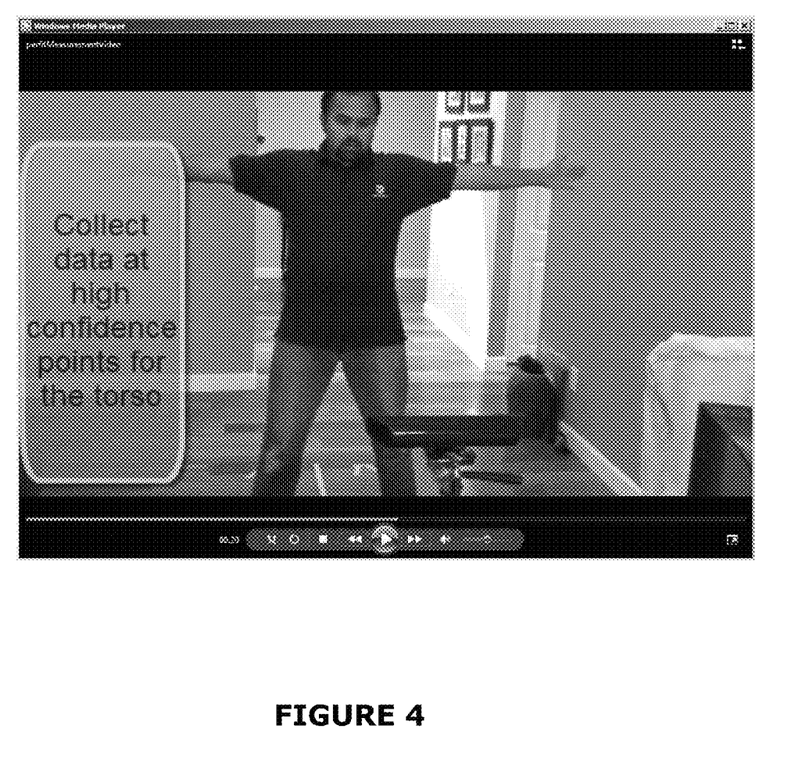
Figure 5:
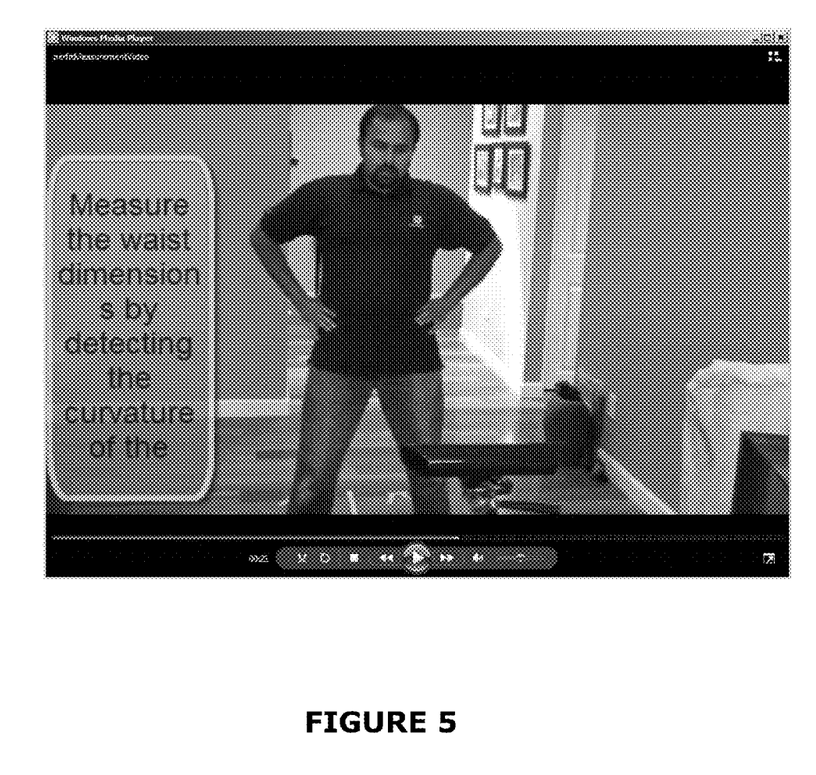
Figure 6:
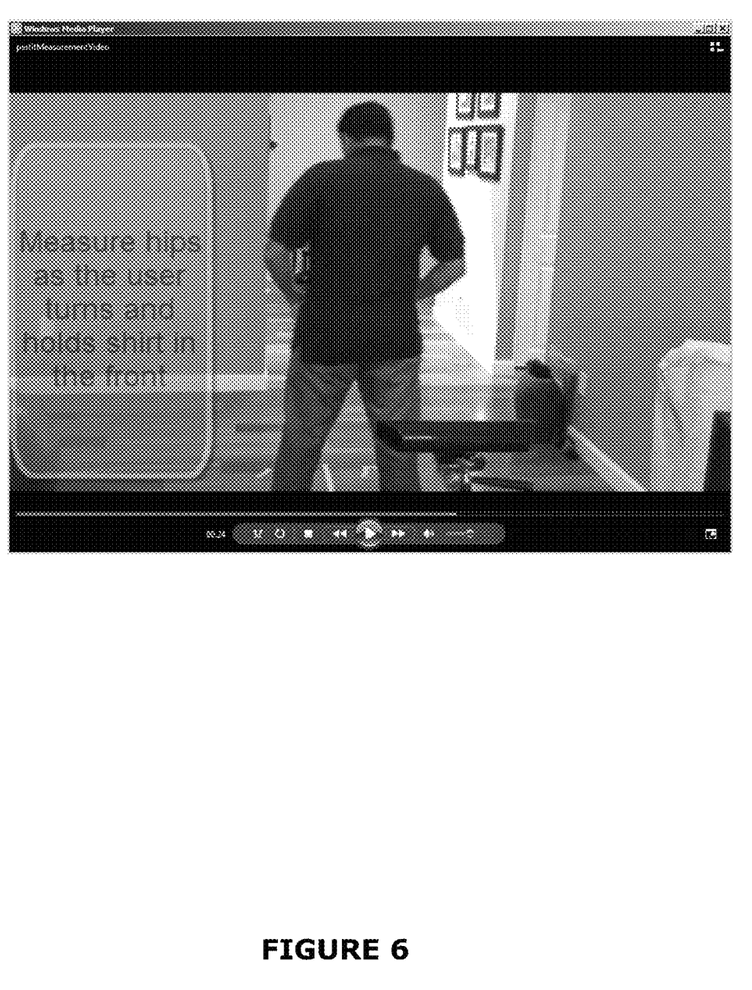
Figure 7:
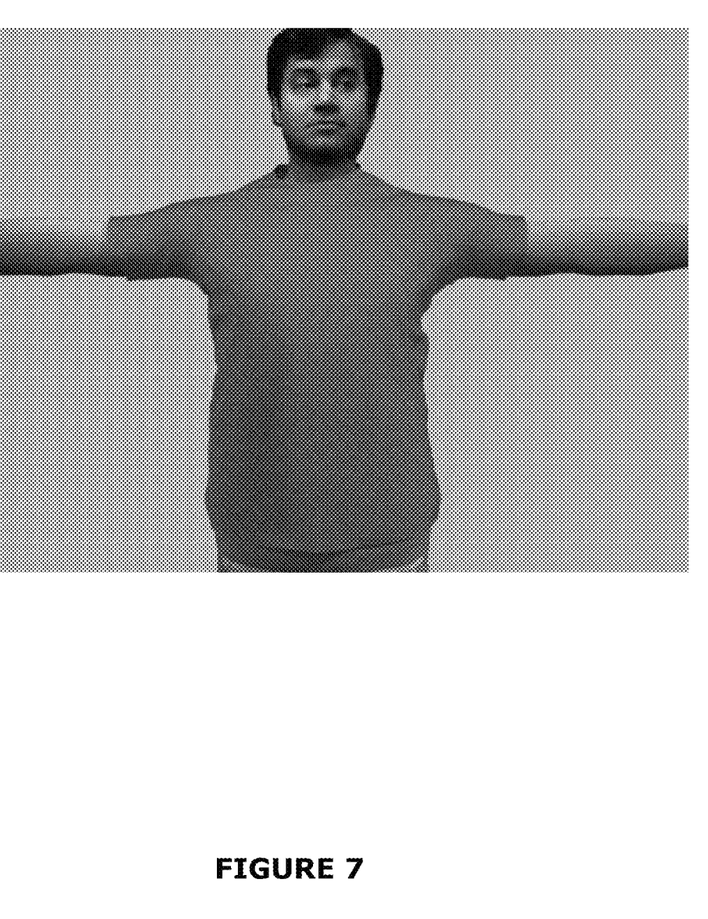
Figure 8:
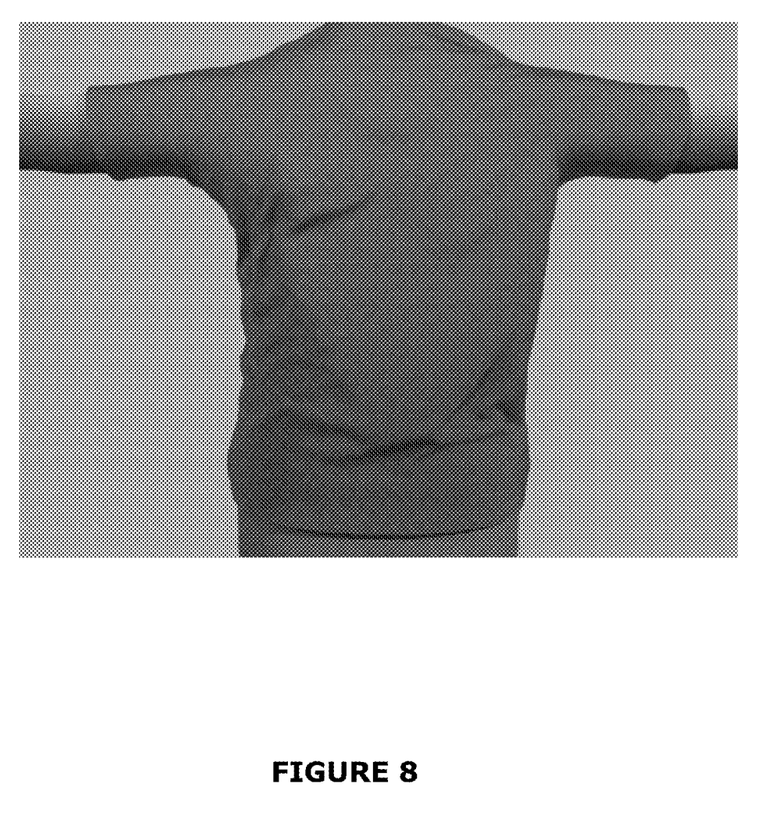
Figure 9:
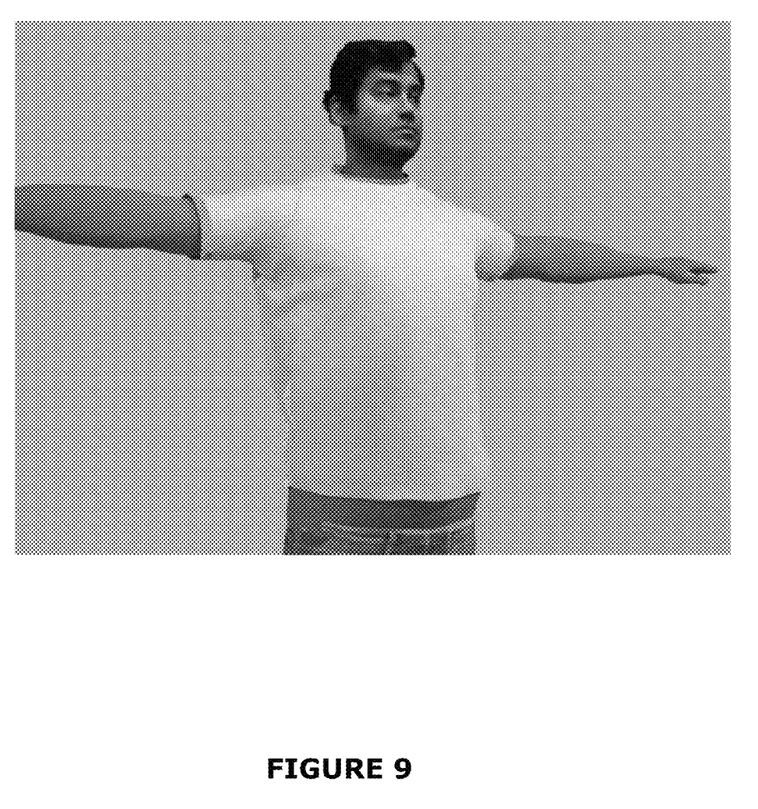
Figure 10:
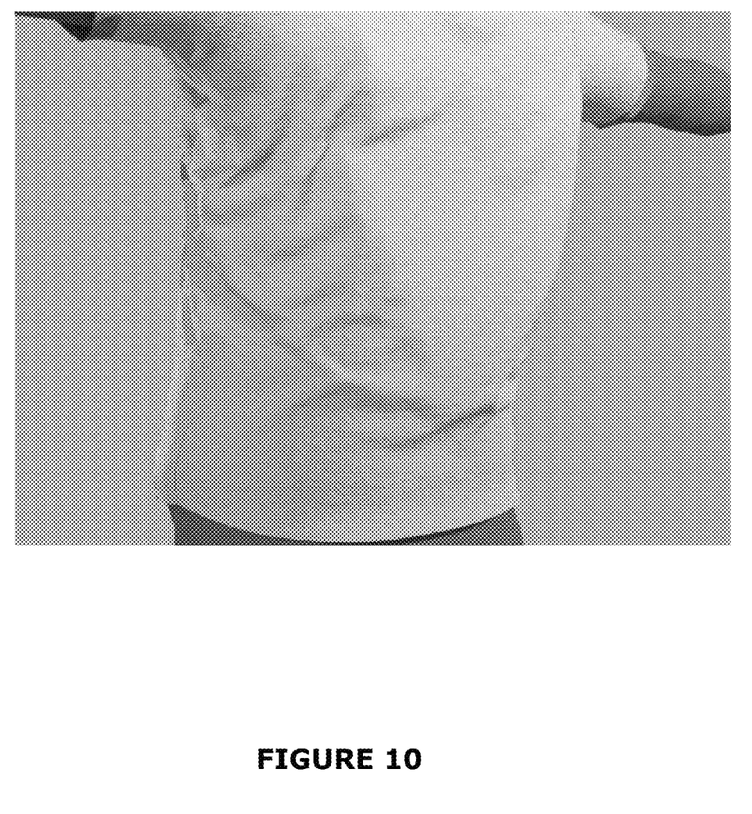

As shown in FIG. 4, characteristics of the subject's body may be determined with reference to a confidence level associated with the determined characteristic. For example, portions of the subject's body that are determined to be covered in baggy clothing may have a relatively low confidence level, where portions of the subject's body where the clothing is tight-fitting (e.g., along the upper arms of the subject in FIG. 4) may have a relatively higher confidence level. Any desired characteristic of the subject, such as the size of the subject's waist (FIG. 5) and hips (FIG. 6) may be determined. Embodiments of the present disclosure may use data from the determined characteristics to generate an image of the subject's body as described in more detail below.

A third image of the subject's body may be generated (140) to show the subject from different angles (e.g., front, back, partial side, etc.) to allow the subject to see different aspects of the clothing or accessories he or she might purchase. Generating an image of the subject's body based on the determined dimensions may also includes adjusting the image of the subject's body based on a known gender for the subject, as well as other factors (e.g., age, height). Portions of the subject's body, particularly those obscured by clothing in the received images, may be determined by generating various shapes such as curves, ellipses, parabolas, cardoids, and other shapes for representing at least a portion of the subject's body. Such shapes may be selected based on the portion of the body being generated, or based on any other suitable factors. Examples of generated images for the front and back of a subject are shown in FIGS. 7-10.

Embodiments of the present disclosure can thus generate a composite image that includes a generated image of the subject's body (based on the determined dimensions of the subject's body) coupled with an actual image of the subject's head. The image of the subject's head may be taken from the same images used to determine the characteristics of the subject's body, or based on other images. In one embodiment, the user may sit in a chair and perform a 360-degree rotation in front of a three-dimensional camera to provide the image of the subject's head.

Generation of the composite body/head image may include merging the image of the subject's body and the image of the subject's head using a uniform morphing technique between a lower portion of the subject's head (e.g., the subject's chin) and an upper portion of the subject's body (e.g., the subject's chest). In one embodiment, generating the composite image includes applying a color gradient present on the subject's head in the received images to a portion of the third image where the image of the subject's body and the image of the subject's head interface (e.g., the neck area). In one embodiment, a color gradient under the eyes of the subject is used along the neck area to help seamlessly blend the actual image of the subject's head with the generated image of the subject's body.

In addition to displaying garments using the generated image of the subject's body, embodiments of the present disclosure may also use the determined characteristics of a subject to identify and suggest a particular garment or accessory (e.g., that might fit the subject's body particularly well). Likewise, in some embodiments, an alert (e.g., visual and/or audible) can be provided (150) if it is determined that a size of garment selected by the user is not likely to fit the subject, based on the determined dimensions of the subject. In this manner, embodiments of the present disclosure can use the characteristics determined for the subject to encourage purchases the subject will appreciate, as well as to warn the subject if he/she is about to purchase an item the subject is unlikely to be happy with. This can not only increase revenues and customer satisfaction, but also reduce returns and negative feedback from consumers.

Any of the images captured from an image creation device (such as the first or second images) as well as images generated by the system (e.g., the third composite image) may be presented (160) to a user in any desired manner, such as via a display device in communication with the system generating the third image. For example, any image (such as the images in FIGS. 7-10 showing a user wearing a garment for potential purchase) may be presented to a user in real-time or near-real-time via a mobile platform with a display device such as an IPHONE or ANDROID device. The system may also store (170) any images received or generated in a database in communication with the system for later retrieval and use.

Figure 11:
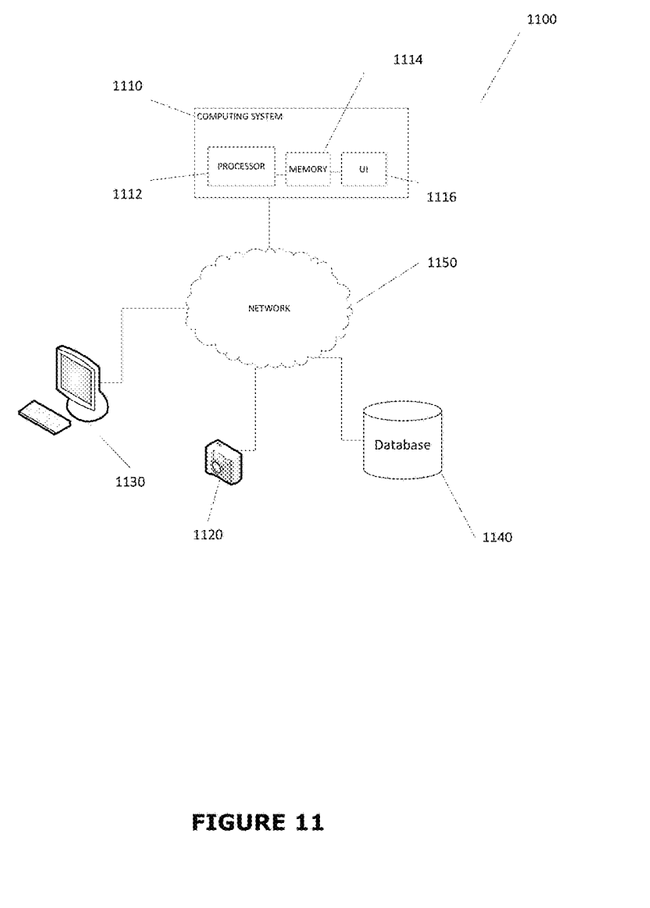
FIG. 11 is a block diagram of an exemplary system according to various embodiments.

FIG. 11 is a block diagram of system which may be used in conjunction with various embodiments. While FIG. 11 illustrates various components of a computer system, it is not intended to represent any particular architecture or manner of interconnecting the components. Other systems that have fewer or more components may also be used.

In FIG. 11, the system 1100 includes a computer system 1110 comprising a processor 1112, memory 1114, and user interface 1116. Computer system 1110 may include any number of different processors, memory components, and user interface components, and may interact with any other desired systems and devices in conjunction with embodiments of the present disclosure.

The functionality of the computer system 1110, including the method depicted in FIG. 1, (in whole or in part), may be implemented through the processor 1112 executing computer-readable instructions stored in the memory 1114 of the system 1110. The memory 1114 may store any computer-readable instructions and data, including software applications, applets, and embedded operating code.

The functionality of the system 1110 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 1112 retrieves and executes instructions stored in the memory 1114 to control the operation of the system 1110. Any type of processor, such as an integrated circuit microprocessor, microcontroller, and/or digital signal processor (DSP), can be used in conjunction with embodiments of the present disclosure. A memory 1114 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 1114 in any desired manner, such as in a relational database.

The system 1110 includes a user interface 1116, which may include any number of input devices (not shown) to receive commands, data, and other suitable input from a user. The user interface 1116 may also include any number of output devices (not shown) to provides the user with data, notifications, and other information. Typical I/O devices may include mice, keyboards, modems, network interfaces, printers, scanners, video cameras and other devices.

The system 1110 may communicate with one or more image creation devices 1120 (such as digital cameras and three-dimensional cameras), client computing devices 1130, databases 1140, graphics processing hardware and/or software (not shown), as well as other systems and devices in any desired manner, including via network 1150.

The system 1110, image creation devices 1120, and/or client computing devices 1130 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The database 1140 may include a relational, hierarchical, graphical, object-oriented structure, and/or any other database configuration. The database 1140 may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

The various system components may be independently, separately or collectively suitably coupled to the network 1150 via data links which includes, for example, a connection to an Internet Service Provider (ISP) over a local loop as is typically used in connection with standard modem communication, cable modem, satellite networks, ISDN, Digital Subscriber Line (DSL), or various wireless communication methods. It is noted that the network may be implemented as other types of networks, such as an interactive television (ITV) network.

The network 1150 may include any electronic communications system or method, including any cloud, cloud computing system or electronic communications system or method and may incorporate any suitable hardware and/or software components. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, offline communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and one or more databases (e.g., storing images of various clothing items and accessories and/or images of users).

Computer systems operating in conjunction with embodiments of the present disclosure may include an operating system (e.g., Windows OS2, UNIX, Linux, Solaris, MacOS, etc.) as well as various conventional support software and drivers typically associated with computers.

Various functionality may be performed via a web browser and/or application interfacing utilizing a web browser. Such browser applications may comprise Internet browsing software installed within a computer system to perform various functions. Any number and type of computing device or system may be used in conjunction with embodiments of the present disclosure, including laptops, notebooks, tablets, hand held computers, personal digital assistants, cellular phones, smart phones, set-top boxes, workstations, computer-servers, main frame computers, mini-computers, PC servers, pervasive computers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, or any other of the myriad software packages available for browsing the internet.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

Embodiments of the present disclosure may be embodied as a customization of an existing system, an add-on product, a processing apparatus executing upgraded software, a stand alone system, a distributed system, a method, a data processing system, a device for data processing, and/or a computer program product. Accordingly, embodiments of the present disclosure may be implemented using a processing apparatus executing code, an internet based embodiment, an entirely hardware embodiment, and/or combinations thereof. Furthermore, embodiments of the present disclosure may include a computer program product on a computer-readable storage medium having computer-readable program code embodied in the storage medium. Any suitable computer-readable storage medium may be utilized, including hard disks, CD-ROM, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A computer-implemented method comprising:
receiving, by a computer system over a network, a first image of a human subject from an image creation device, the first image including a portion of the subject's body;

determining, based on the first image, dimensions of the subject's body;

determining, based on the first image, a first fit of clothing to the subject's body for a first portion of the subject's body covered in the clothing;

determining, based on the first image, that a second fit for a second portion of the subject's body covered in the clothing is more tight-fitting than the first fit;

receiving, by the computer system over the network, a second image of the subject from the image creation device, the second image including the subject's head;

generating a third image by the computer system, the third image including an image of the subject's body based on the determined dimensions, and an image of the subject's head based on the second image, the generating including merging the image of the subject's body and the image of the subject's head using a morphing technique between a lower portion of the subject's head and an upper portion of the subject's body, and the generating further including:

determining a first confidence level for the first portion of the subject's body, the first confidence level based on the first fit, and determining a second confidence level for the second portion of the subject's body, the second confidence level based on the second fit, wherein the second confidence level is greater than the first confidence level, and the third image is generated based on the first confidence level and the second confidence level;

storing one or more of the first image, the second image, or the third image in a database in communication with the computer system; and presenting the third image via a display device in communication with the computer system.

2. The method of claim 1, wherein the lower portion of the subject's head includes the subject's chin, and wherein the upper portion of the subject's body includes the subject's chest.

3. The method of claim 1, wherein the subject is wearing clothes in one or more of the first image or the second image.

4. The method of claim 1, wherein the image creation device comprises a three-dimensional camera.

5. The method of claim 1, wherein determining the dimensions of the subject's body is based on a first plurality of received images, and the subject is in different poses in at least two of the images.

6. The method of claim 1, wherein the image of the subject's head is based on a second plurality of received images.

7. The method of claim 1, wherein generating the image of the subject's body based on the determined dimensions includes adjusting the image of the subject's body based on a known gender for the subject.

8. The method of claim 1, wherein generating the image of the subject's body based on the determined dimensions includes determining one or more of a curve, an ellipse, an parabola, or a cardioid for representing at least a portion of the subject's body.

9. The method of claim 1, wherein generating the image of the subject's body based on the determined dimensions includes determining a characteristic for a portion of the subject's body that is covered by clothing in the first received image.

10. The method of claim 1, wherein generating the third image includes applying a color gradient present on the subject's head in the second image to a portion of the third image where the image of the subject's body and the image of the subject's head interface.

11. The method of claim 1, wherein generating the third image includes applying an error correction factor to the generated image of the subject's body, and the error correction factor is determined based on an interaction of the subject's clothing and the subject's body from the first image.

12. The method of claim 1, further comprising providing one or more of an audible alert or a visual alert via a user interface in communication with the computer system in response to a determination that a size of garment selected by the user is not likely to fit the subject, based on the determined dimensions of the subject.

13. A tangible, non-transitory, computer-readable medium storing instructions that, when executed by a computer system, cause the computer system to:

receive, over a network, a first image of a human subject from an image creation device, the first image including a portion of the subject's body;

determine, based on the first image, dimensions of the subject's body;

determine, based on the first image, a first fit of clothing to the subject's body for a first portion of the subject's body covered in the clothing;

determine, based on the first image, that a second fit for a second portion of the subject's body covered in the clothing is more tight-fitting than the first fit;

receive, over the network, a second image of the subject from the image creation device, the second image including the subject's head;

generate a third image, the third image including an image of the subject's body based on the determined dimensions, and an image of the subject's head based on the second image, the generating including merging the image of the subject's body and the image of the subject's head using a morphing technique between a lower portion of the subject's head and an upper portion of the subject's body, and the generating further including:

determining a first confidence level for the first portion of the subject's body, the first confidence level based on the first fit, and determining a second confidence level for the second portion of the subject's body, the second confidence level based on the second fit, wherein the second confidence level is greater than the first confidence level, and the third image is generated based on the first confidence level and the second confidence level;

store one or more of the first image, the second image, or the third image in a database in communication with the computer system; and present the third image via a display device in communication with the computer system.

14. A system comprising:
a database configured to store images;
a display device;
a processor; and
memory in communication with the processor and storing instructions that, when executed by the processor, cause the system to:

receive, over a network, a first image of a human subject from an image creation device, the first image including a portion of the subject's body;

determine, based on the first image, dimensions of the subject's body;

determine, based on the first image, a first fit of clothing to the subject's body for a first portion of the subject's body covered in the clothing;

determine, based on the first image, that a second fit for a second portion of the subject's body covered in the clothing is more tight-fitting than the first fit;

receive, over the network, a second image of the subject from the image creation device, the second image including the subject's head;

generate a third image, the third image including an image of the subject's body based on the determined dimensions, and an image of the subject's head based on the second image, the generating including merging the image of the subject's body and the image of the subject's head using a morphing technique between a lower portion of the subject's head and an upper portion of the subject's body, and the generating further including:

determining a first confidence level for the first portion of the subject's body, the confidence level based on the first fit, and determining a second confidence level for the second portion of the subject's body, the second confidence level based on the second fit, wherein the second confidence level is greater than the first confidence level, and the third image is generated based on the first confidence level and the second confidence level;

store one or more of the first image, the second image, or the third image in the database; and present the third image via the display device.

* * * * *